United States Patent [19]
Takase et al.

[11] Patent Number: 5,260,626
[45] Date of Patent: Nov. 9, 1993

[54] APPARATUS FOR SUPPRESSING FIELD RADIATION FROM DISPLAY DEVICE

[75] Inventors: Katsuhisa Takase; Masakazu Terada; Yoshikazu Sakai; Masatoshi Michihata; Yoshiyuki Nakashima, all of Ishikawa, Japan

[73] Assignee: Nanao Corporation, Japan

[21] Appl. No.: 837,756

[22] Filed: Feb. 19, 1992

[30] Foreign Application Priority Data

| Feb. 20, 1991 | [JP] | Japan | 3-25980 |
| Apr. 5, 1991 | [JP] | Japan | 3-73236 |
| Aug. 28, 1991 | [JP] | Japan | 3-68610[U] |
| Sep. 4, 1991 | [JP] | Japan | 3-224244 |

[51] Int. Cl.[5] ............................ H01J 1/52; H01J 5/02
[52] U.S. Cl. .................................................. 315/85
[58] Field of Search ............ 315/85, 8; 313/313; 358/245; 361/424

[56] References Cited

U.S. PATENT DOCUMENTS

| 4,922,153 | 5/1990 | Kevius | 315/85 X |
| 4,996,461 | 2/1991 | Bentley | 315/85 X |
| 5,101,139 | 3/1992 | Lechter | 315/85 |
| 5,107,179 | 4/1992 | Vidovich | 315/85 X |
| 5,151,635 | 9/1992 | Cappels | 315/85 X |

FOREIGN PATENT DOCUMENTS

| 0272234 | 6/1988 | European Pat. Off. . |
| 0316817 | 5/1989 | European Pat. Off. . |
| 8716945 | 4/1988 | Fed. Rep. of Germany . |
| 9010992 | 9/1990 | PCT Int'l Appl. . |
| 2217959 | 11/1989 | United Kingdom . |

Primary Examiner—David Mis
Attorney, Agent, or Firm—Ostrolenk, Faber, Gerb & Soffen

[57] ABSTRACT

In order to eliminate any harmful influence due to electric field radiation on the human body, electric field radiation from a front surface of a cathode ray tube is reduced. A degaussing coil arranged in proximity to a peripheral edge of a front surface of a cathode ray tube is employed advantageously. The degaussing coil is supplied with a voltage which is opposite in polarity to an electric field radiated from the front surface of the cathode ray tube. The reverse polarity voltage is derived from an output signal obtained from an output signal of a horizontal deflection circuit by a flyback transformer and/or derived from a voltage obtained by phase-inverting an anode voltage fluctuating in vertical synchronization. After a degaussing operation is completed, relay contacts are opened on the basis of a timer-controlled relay switch, thereby completely cutting the connection between the degaussing coil and a degaussing power source generating an alternating current which is supplied to the degaussing coil for the degaussing operation.

20 Claims, 15 Drawing Sheets

APPARATUS FOR SUPPRESSING FIELD RADIATION FROM DISPLAY DEVICE

BACKGROUND OF THE INVENTION

1. Field of the Invention

The present invention relates to an suppressing field radiation from a display device.

2. Description of the Background Art

In a visual display terminal (VDT) employing a cathode ray tube, field radiation, particularly that in a range of 5 Hz to 400 kHz, problematically exerts a harmful influence upon the human body. According to the MPR standards (MPR 1990) in Sweden, for example, alternating electric fields (AEF) are regulated not to exceed 25 V/m and 2.5 V/m in BANDs I (20 Hz to 2 kHz) and II (2 kHz to 400 kHz) respectively It has been recognized that an electric field which is radiated from a VDT is generally caused by flyback pulses of the horizontal deflection circulating, and this electric field is mainly generated from a deflection yoke which is mounted on a cathode ray tube. Such an electric field which is caused by flyback pulses for horizontal deflection appears in a relatively high frequency domain in the aforementioned frequency range. In addition to the aforementioned electric field based on flyback pulses for horizontal deflection, the VDT also radiates an electric field caused by a high voltage, which is applied to an anode of the cathode ray tube, fluctuating in vertical synchronization. Such an electric field which is caused by the voltage fluctuating in vertical synchronization appears in a relatively low frequency domain in the aforementioned frequency range.

In a region other than the front surface of the cathode ray tube, the human body can be effectively shielded against radiation of such an electric field by a shielding member made of a metal plate or the like.

In a region in front of the cathode ray tube, however, the human body cannot be simply shielded by such a shielding member as a metal plate or the like, since it is necessary to visually display images on the front surface.

In order to prevent the front surface of the cathode ray tube from being charged with a high applied voltage thereby protecting the front surface from dust in the air, on the other hand, a transparent conductive film is formed on the front surface of the cathode ray tube, or a transparent panel is arranged in front of the cathode ray tube, and grounded. Such a transparent conductive film can shield the human body against an electric field which is radiated from the front surface of the cathode ray tube to some extent. However, a high cost is required for forming such a transparent conductive film, whose shielding effect is rather insufficient considering its cost.

While a liquid crystal display device is regarded as having a smaller field radiation as compared with a display device employing a cathode ray tube, electric fields are problematically radiated from a back light, an invertor, an alternatingly driven display panel and the like which are included in the liquid crystal display device.

In addition to the liquid crystal display device, such a problem is also caused in an alternatingly driven flat display device such as a plasma display device, for example.

SUMMARY OF THE INVENTION

Accordingly, an object of the present invention is to provide an apparatus which can effectively suppress an electric field radiated from a display surface of a display device.

The inventive apparatus for suppressing field radiation from a display device employs no shielding means as described above, but is adapted to positively cancel the electric field as radiated. In order to solve the aforementioned problem, an electrode is arranged in proximity to the peripheral edge of a display surface of the display device and supplied with a voltage which is reverse in polarity to the electric field radiated from the display surface of the display device.

Means for applying the voltage of reverse polarity to the electrode preferably includes means for adjusting the phase and regulating the amplitude of this voltage.

Thus, according to the present invention, it is possible to suppress the electric field which is radiated from the display surface of the display device. Such a suppressing effect is most remarkably attained when the voltage of reverse polarity applied to the electrode is similar in waveform to and synchronized with the electric field which is radiated from the display surface of the display device.

According to the present invention, therefore, it is possible to reduce field radiation, which has the possibility of exerting a harmful influence on the human body, at a low cost.

The present invention can be advantageously employed for canceling an electric field which is radiated from a front surface of a cathode ray tube, for example. In this case, the electrode to be supplied with a voltage of reverse polarity may be provided by a degaussing coil which is adapted to eliminate remanence from a shadow mask or an aperture grill of the cathode ray tube. Since an ordinary cathode ray tube is already provided with such a degaussing coil, it is not necessary to newly prepare an electrode in particular.

If the degaussing coil degausses the cathode ray tube through an automatic degaussing circuit employing a positive temperature coefficient thermistor, for example, the degaussing circuit is still supplied with a voltage after current attenuation. When this voltage is superimposed on the voltage for canceling the electric field which is radiated from the cathode ray tube, the effect of the cancelling voltage may be reduced. In order to avoid such a disadvantage, a connection between a degaussing power source for supplying the degaussing coil with an alternating current, and the degaussing coil, may be completely cut after the cathode ray tube is degaussed. Such connection may be cut by a timer-controlled switch, so that no complicated operation is required.

As hereinabove described, the cancel voltage is preferably similar in waveform to and synchronized with the electric field which is radiated from the cathode ray tube. Thus, a voltage for canceling an electric field caused by horizontal deflection flyback pulses can be advantageously formed by a signal, being derived from a flyback pulse signal of a horizontal deflection circuit, which is reverse in polarity to the flyback pulse signal. In order to cancel an electric field caused by a voltage which is applied to an anode of the cathode ray tube and fluctuates in vertical synchronization, on the other hand, the cancel voltage can be advantageously formed by a voltage obtained by phase-inverting the voltage fluctuating in vertical synchronization. When both such cancel voltages are applied to the electrode, it is possible to advantageously cancel both of the aforementioned electric fields According to a preferred embodiment of the present invention, a conductive member for supplying an electric or magnetic field around a cathode ray tube, can be employed as an electrode for suppressing field radiation from the cathode ray tube, a degaussing coil, or a member serving both as the electrode and the degaussing coil.

The conductive member, which is mounted in engagement with a plurality of stop members located around the cathode ray tube, comprises a conductive wire of a prescribed length whose end portions are both tied up toward the same direction and a slider receiving such end portions of the wire in common and being movable along the end portions.

The end portions of the wire are tied up toward the same direction, to define a loop. This wire engages with the plurality of stop members in a state defining a relatively long loop. Then the slider is moved to shorten the loop which is defined by the wire, whereby the wire extends between the plurality of stop members with proper tension, to locate the conductive member in a prescribed position.

Thus, it is possible to easily mount the conductive member, which can be employed as an electrode for suppressing field radiation from the cathode ray tube or a degaussing coil, on an arbitrary position. Therefore, the conductive member can be mounted without reducing working efficiency.

Since the wire is conductive, it is possible to securely connect a power source to its end. Thus, high reliability can be expected in relation to a state of electrical connection.

The plurality of stop members for engaging with the wire are preferably located on a front panel which is arranged to cover the periphery of the front surface of the cathode ray tube, in order to locate the conductive member in a position effective for suppressing field radiation. Further, the stop members can be more easily worked or processed on the front panel side as compared with the cathode ray tube side.

When the slider has a tubular configuration, the same can be easily maintained in a position after movement.

When the conductive wire is insulation-coated and the aforementioned tubular slider is formed of an insulating material, voltage resistance is so improved that a high voltage can be applied to the wire with no problem. Particularly when the conductive member is employed for suppressing field radiation, a high voltage of about 1 kV is applied to the wire, for example.

The present invention is also applicable to cancellation of an electric field which is radiated from a display panel of a flat display device such as a liquid crystal display device or a plasma display device.

Particularly in an alternatingly driven liquid crystal display device, an alternating voltage which is applied to a common electrode provided in its liquid display panel mainly causes an electric field radiated from the display panel. In this case, therefore, it is possible to effectively cancel the electric field radiated from the display panel by supplying the electrode with a voltage which is obtained by phase-inverting the alternating voltage.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
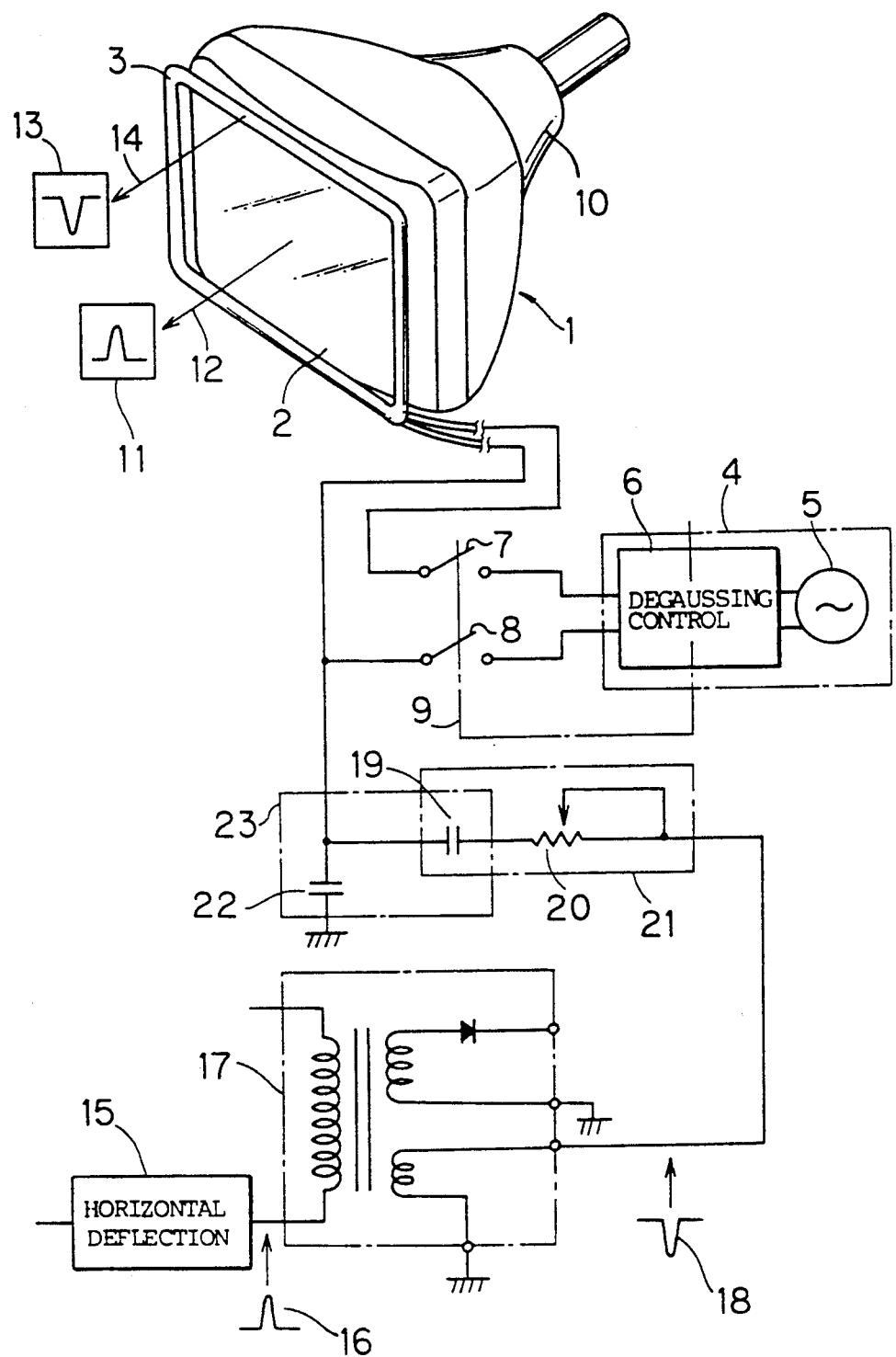
FIG. 1 illustrates an apparatus for suppressing field radiation from a cathode ray tube according to an embodiment of the present invention, with a perspective view showing a cathode ray tube 1 and a circuit diagram showing a circuit for suppressing field radiation which is caused by flyback pulses of horizontal deflection.

FIG. 1 shows an embodiment of the present invention. This embodiment is adapted to cancel a particularly serious electric field which is caused by flyback pulses horizontal deflection flyback pulses, among electric fields radiated from a cathode ray tube 1.

A degaussing coil 3 is arranged in proximity to the peripheral edge of a front surface 2 of the cathode ray tube 1. The degaussing coil 3, which is adapted to eliminate remanence from a shadow mask (not shown) provided in the cathode ray tube 1, is in the form of a loop enclosing the front surface 2 in this embodiment.

A degaussing power source 4 supplies the degaussing coil 3 with an alternating current. In more concrete terms, an AC power supply 5 included in the degaussing power source 4 supplies the alternating current, which is attenuated with a lapse of time in a degaussing control circuit 6 including a positive temperature coefficient thermistor, for example. When an apparatus comprising the cathode ray tube 1 is supplied with power, relay contacts 7 and 8 are closed respectively so that the alternating current, which is attenuated with a lapse of time, is supplied from the degaussing power source 4 to the degaussing coil 3. When this alternating current is sufficiently attenuated, a relay switch 9 which is timer-controlled by a one-shot multivibrator or the like operates to open both of the relay contacts 7 and 8. After a lapse of a prescribed time, therefore, no voltage is applied to the degaussing coil 3 from the degaussing power source 4.

During the operation of the cathode ray tube 1, on the other hand, the front surface 2 of the cathode ray tube 1 radiates an electric field 12 having a waveform 11 on the basis of an electric field which is caused by of horizontal deflection flyback pulses mainly generated in a deflection yoke 10. In order to cancel this electric field 12, a voltage reverse in polarity to the electric field 12 is applied to the degaussing coil 3, which also serves as an electrode, according to this embodiment. Upon such application of the voltage of reverse polarity, the degaussing coil 3 generates an electric field 14 having a waveform 13. The waveform 13 is similar to and synchronized with the waveform 11. Therefore, the electric field 12 radiated from the front surface 2 of the cathode ray tube 1 is effectively canceled by the electric field 14 which is generated from the degaussing coil 3.

In order to generate the electric field 14 having the waveform 13 from the degaussing coil 3, it is possible to advantageously use a signal which has already been employed for another usage in the apparatus comprising the cathode ray tube 1. For example, an output signal (flyback pulse signal in particular) of a horizontal deflection circuit or a signal derived from such an output signal is conveniently similar in waveform to and synchronized with the electric field 12 which is radiated from the front surface 2 of the cathode ray tube 1. Thus, an output signal which is obtained from a flyback transformer or a horizontal output transformer, for example, can be effectively used as a voltage to be applied to the degaussing coil 3.

According to this embodiment, a voltage provided by an output signal 18 of a flyback transformer 17, which receives an output signal (flyback pulse signal) 16 of a horizontal deflection circuit 15, is applied to the degaussing coil 3, as shown in FIG. 1. This output signal 18 is preferably supplied to the degaussing coil 3 through a phase adjusting circuit 21 which is formed by a capacitor 19 and a variable resistor 20 and an amplitude regulating circuit 23 which is formed by capacitors 19 and 22, for example. Thus, it is possible to adjust the output signal 18 of the flyback transformer 17 to have a waveform which is most effective for canceling the electric field 12 radiated from the front surface 2 of the cathode ray tube 1.

The phase adjusting circuit 21 may be replaced by a circuit employing a transistor, for example, while the amplitude regulating circuit 23 may be replaced by a circuit employing a resistive voltage divider, for example.

The output signal 16 may be extracted from a high voltage output circuit which outputs a high voltage, in place of the horizontal deflection circuit 15.

It has been experimentally confirmed that the front surface 2 of the cathode ray tube 1 radiates an electric field of 3.3 V/m in field radiation of 2 to 400 kHz when no cancel voltage is applied to the degaussing coil 3, while such an electric field can be reduced to 1.2 V/m by applying a cancel voltage to the degaussing coil 3. This value sufficiently satisfies the condition of not more than 2.5 V/m which is set in the regulation related to AEF in the aforementioned MPR standards.

FIGS. 2 to 8 illustrate other embodiments of the present invention, which are modified in relation to provision of electrodes for applying cancel voltages.

Figure 2:
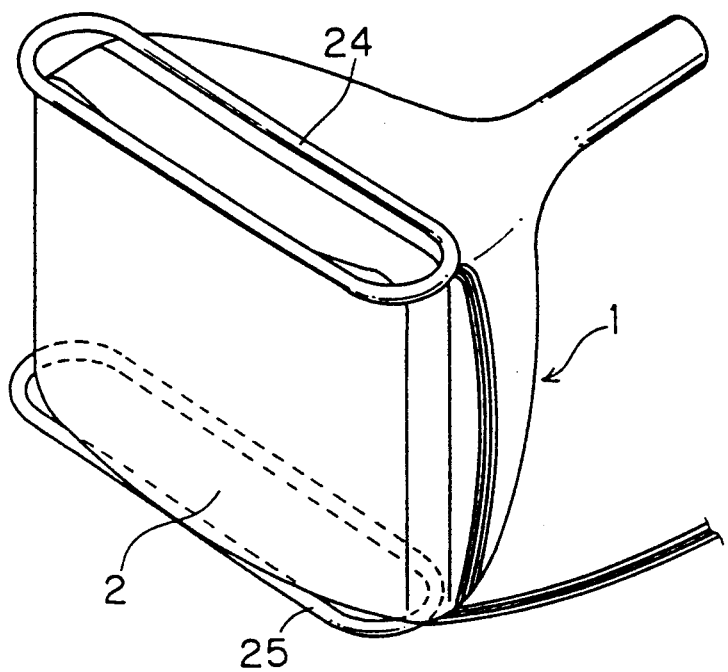
FIG. 2 is a perspective view showing a cathode ray tube 1 according to another embodiment of the present invention.

Referring to FIG. 2, degaussing coils 24 and 25 are arranged along upper and lower edges of a front surface 2 of a cathode ray tube 1. Similarly to the degaussing coil 3 in the aforementioned embodiment, the degaussing coils 24 and 25 are adapted to eliminate remanence from a shadow mask, and are supplied with a cancel voltage.

Figure 3:
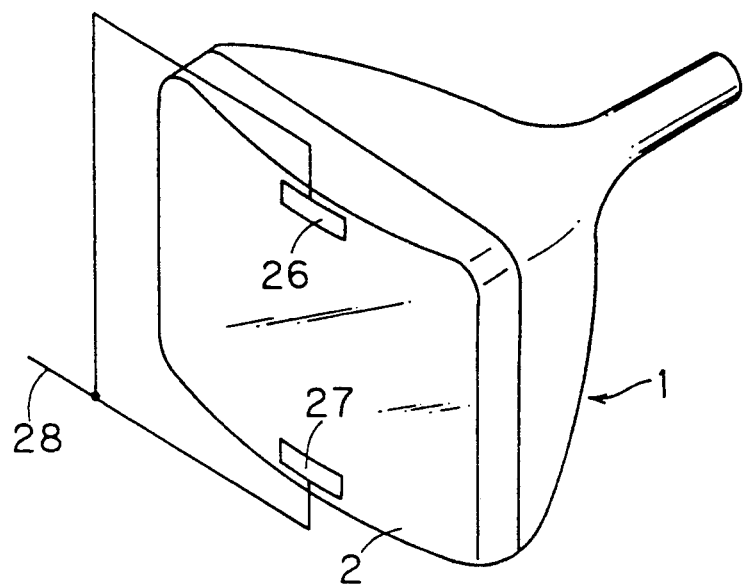
FIG. 3 is a perspective view showing a cathode ray tube 1 according to still another embodiment of the present invention.

Referring to FIG. 3, electrodes 26 and 27 of metal plates or metal tapes are stuck onto portions of a front surface 2 of a cathode ray tube 1 in proximity to upper and lower edges respectively. A cancel voltage is applied to the electrodes 26 and 27 through lead wires 28.

Figure 4:
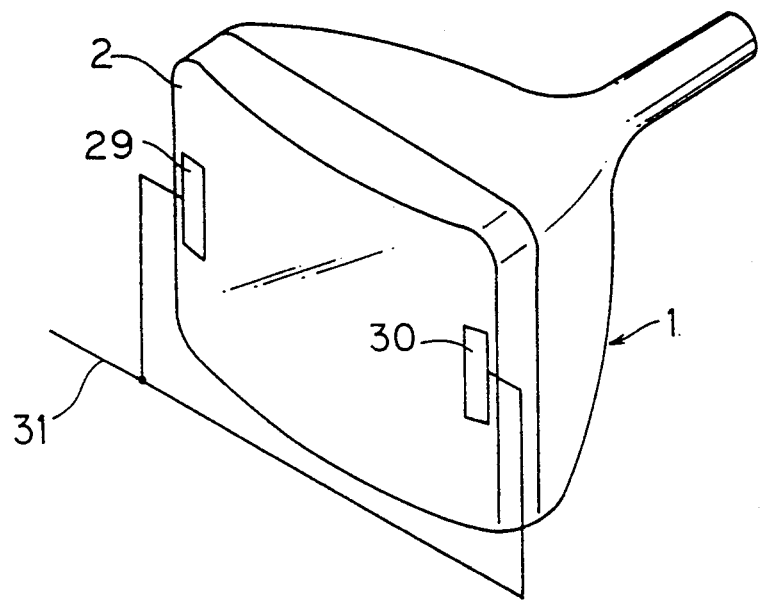
FIG. 4 is a perspective view showing a cathode ray tube 1 according to a further embodiment of the present invention.

Referring to FIG. 4, electrodes 29 and 30 of metal plates or metal tapes are stuck onto portions of a front surface 2 of a cathode ray tube 1 along left and right edges respectively. A cancel voltage is applied to the electrodes 29 and 30 through lead wires 31.

Figure 5:
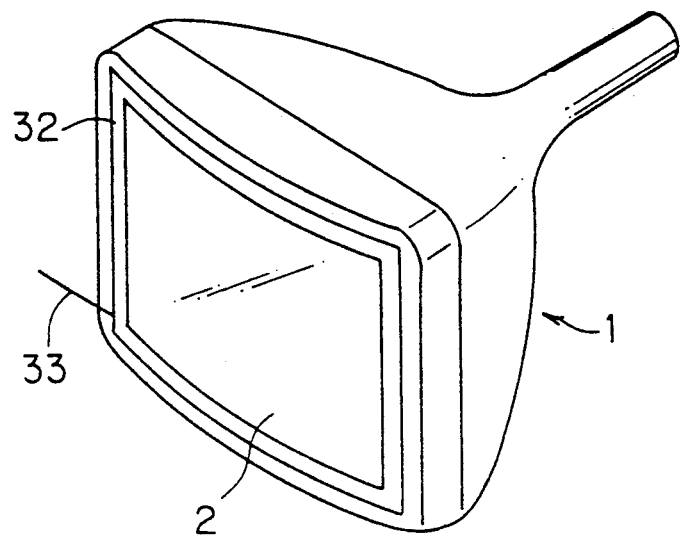
FIG. 5 is a perspective view showing a cathode ray tube 1 according to a further embodiment of the present invention.

Referring to FIG. 5, a loop-shaped electrode 32 of a metal plate or a metal tape is stuck onto a front surface 2 of a cathode ray tube 1 to enclose its peripheral edge.

A cancel voltage is applied to the electrode 32 through a lead wire 33.

Figure 6:
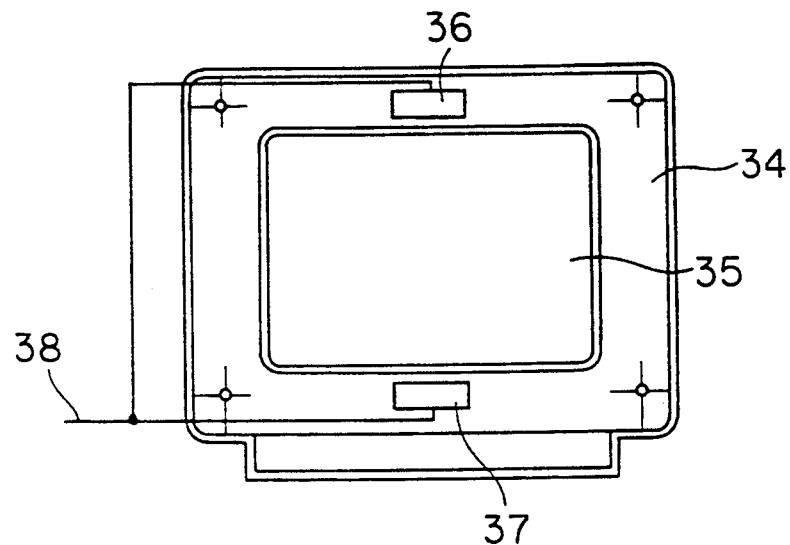
FIG. 6 is a rear elevational view showing a front panel 34 according to a further embodiment of the present invention.
Figure 7:
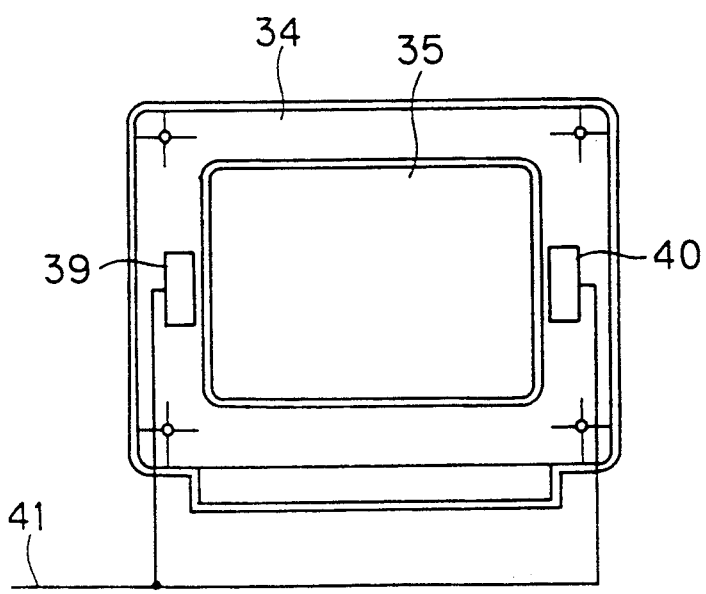
FIG. 7 is a rear elevational view showing a front panel 34 according to a further embodiment of the present invention.
Figure 8:
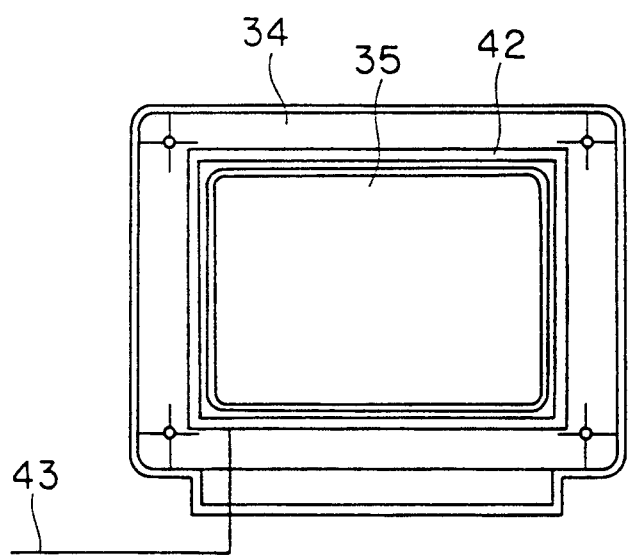
FIG. 8 is a rear elevational view showing a front panel 34 according to a further embodiment of the present invention.

FIGS. 6 to 8 illustrate rear surfaces of front panels 34 which are arranged to cover peripheries of front surfaces of respective cathode ray tubes.

Referring to FIG. 6, electrodes 36 and 37 made of metal plates or metal tapes are stuck onto portions above and under an opening 35 of the front panel 34 respectively. A cancel voltage is applied to the electrodes 36 and 37 through lead wires 38.

Referring to FIG. 7, electrodes 39 and 40 are stuck onto left and right sides of an opening 35 of the front panel 34 respectively. A cancel voltage is applied to the electrodes 39 and 40 through lead wires 41.

Referring to FIG. 8, a loop-shaped electrode 42 made of a metal plate or a metal tape is stuck onto the front panel 34 to enclose the periphery of its opening 35. A cancel voltage is applied to the electrode 42 through a lead wire 43.

FIGS. 9 to 13 illustrate a conductive member 61, which may be employed as an electrode to be supplied with a cancel voltage. The conductive member 61 is so devised that the same can be easily mounted in a desired position.

Figure 9:
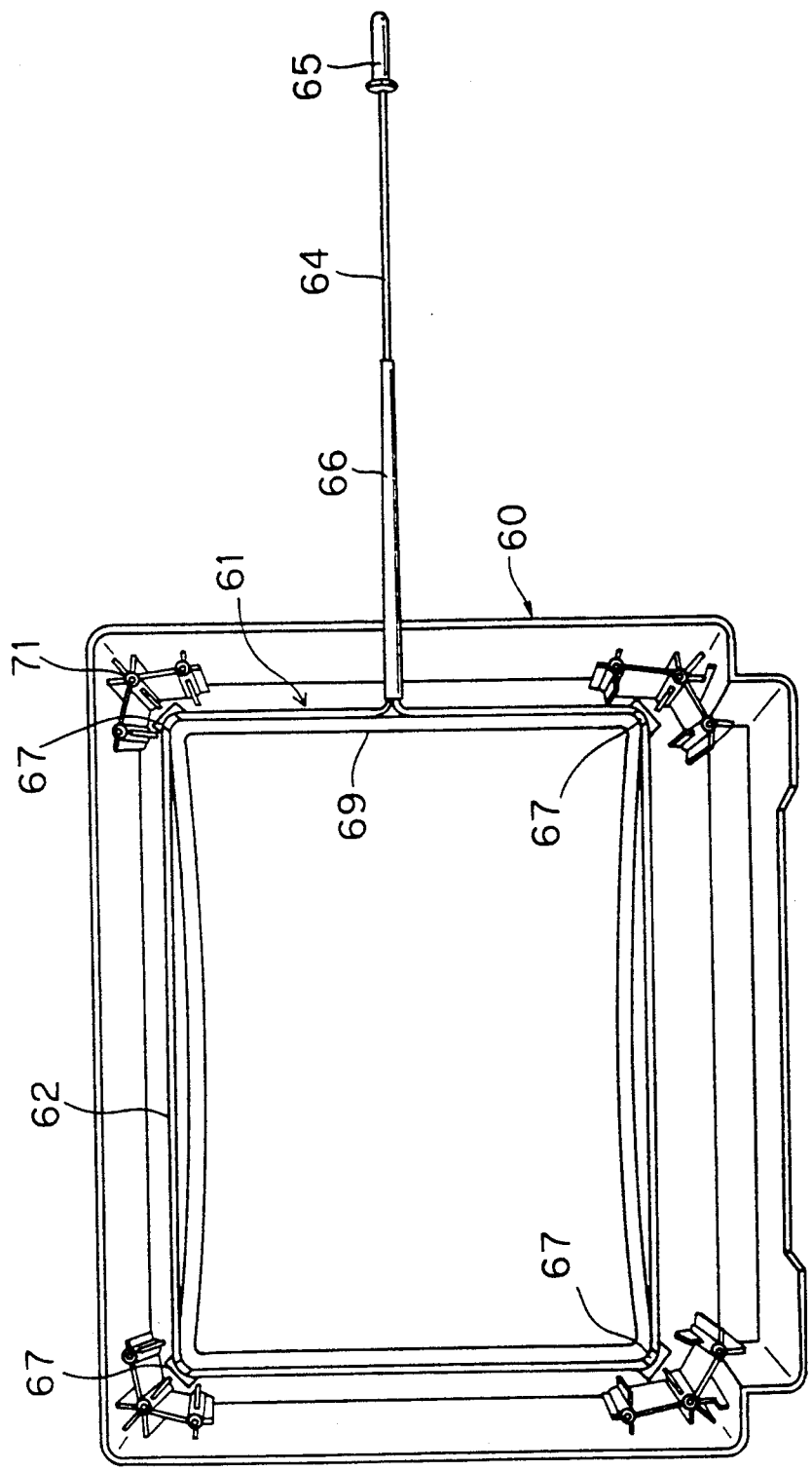
FIG. 9 is a one-point perspective view showing the rear surface of a front panel 60 according to a further embodiment of the present invention, with a conductive member 61 which is mounted on the front panel 60.
Figure 10:
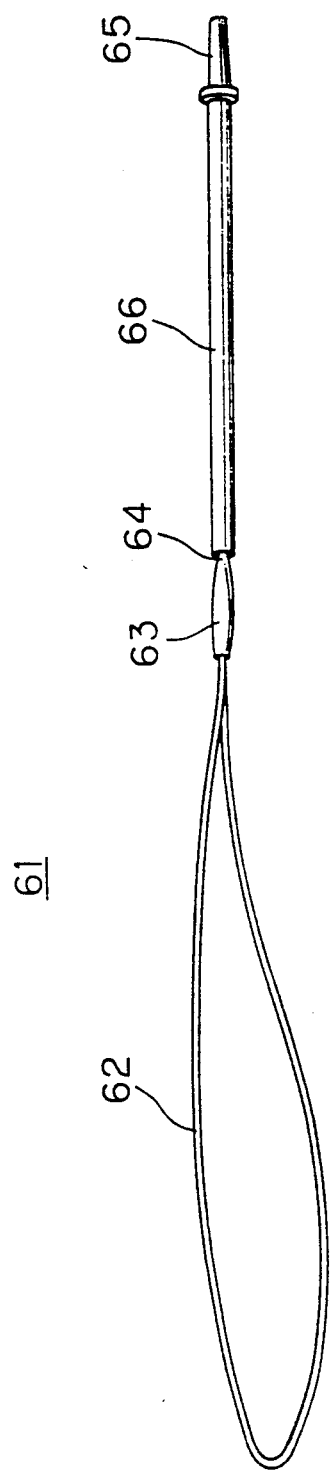
FIG. 10 is a perspective view independently showing the conductive member 61 appearing in FIG. 9.

FIG. 9 illustrates a front panel 60 which is arranged to cover the periphery of a front surface of a cathode ray tube (not shown) as viewed from the rear surface, and the conductive member 61 is provided in this position. FIG. 10 independently illustrates the conductive member 61.

This conductive member 61 comprises an insulation-coated conductive wire 62. Both end portions of this wire 62 are tied up toward the same direction, thereby defining a loop. According to this embodiment, such end portions of the wire 62 are connected to an auxiliary wire 64 at a connecting portion 63. The connecting portion 63 and the auxiliary wire 64 are also insulation-coated. A connector 65 is connected to an end portion of the auxiliary wire 64. This connector 65 is coupled to another connector which is provided on a power source (not shown) for applying a voltage to the conductive member 61.

Referring to FIG. 10, a tubular slider 66 made of a flexible insulating material is located on the auxiliary wire 64. The slider 66 is leftwardly movable from the position shown in FIG. 10, thereby receiving the tied end portions of the wire 62 in common.

FIGS. 9 and 11 to 13 show a plurality of stop members 67 for engaging with the wire 62 of the conductive member 61. The stop members 67, which are formed by resin sheets, for example, have hooks 68 for engaging with the wire 62. The stop members 67 are mounted on the front panel 60 through an adhesive, a pressure sensitive adhesive, or a pressure sensitive adhesive double coated sheet, for example. The front panel 60 has an opening 69 in its center. When the opening 69 is substantially in the form of a quadrangle as shown in these figures, the stop members 67 are located at least in proximity to four corners of the opening 69. A generally employed front panel allows mounting of such stop members 67 with no design change. However, such a generally employed front panel may be changed in design to be provided with the stop members 67. Alternatively, the front panel may integrally be provided with shapes corresponding to the stop members 67.

Figure 11:
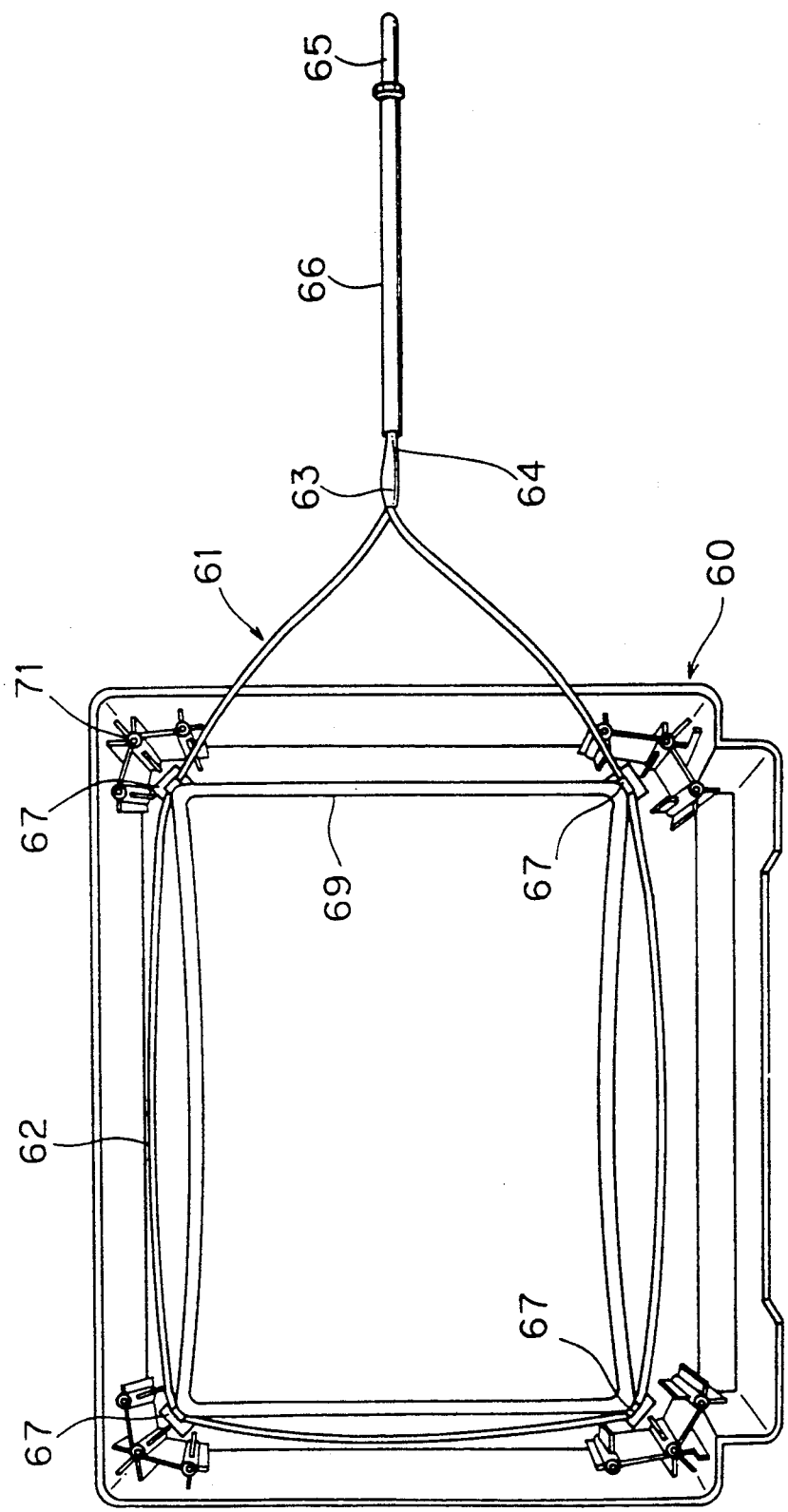
FIG. 11 is a one-point perspective view corresponding to FIG. 9, showing an intermediate state in a step of mounting the conductive member 61 on the front panel 60.
Figure 12:
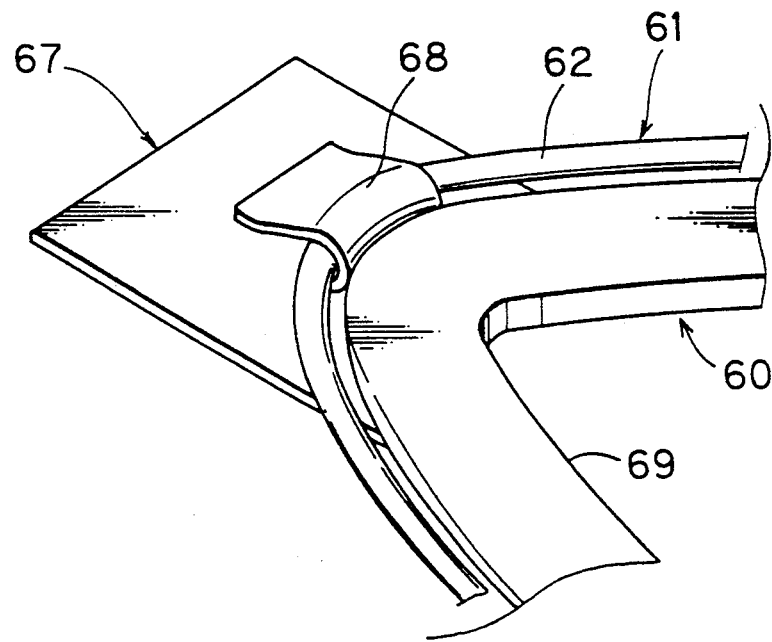
FIG. 12 is an enlarged perspective view showing a structure around one stop member 67 appearing in FIG. 11.

After the plurality of stop members 67 are provided on the front panel 60, the wire 62 engages with the hook 68 of each stop member 67, as shown in FIG. 12. In order to attain such engagement, the wire 62 is made so as to define a relatively large loop, as shown in FIG. 11. Namely, the wire 62 is loosened along the stop members 67 in this stage.

Then, the slider 66 is moved to be separated from the connector 65. Thus, the slider 66 receives the tied end portions of the wire 62 in common as shown in FIG. 9, to reduce the length of the loop defined by the wire 62. Consequently, the wire 62 is supplied with proper tension along the stop members 67, and registered with the front panel 60.

Figure 13:
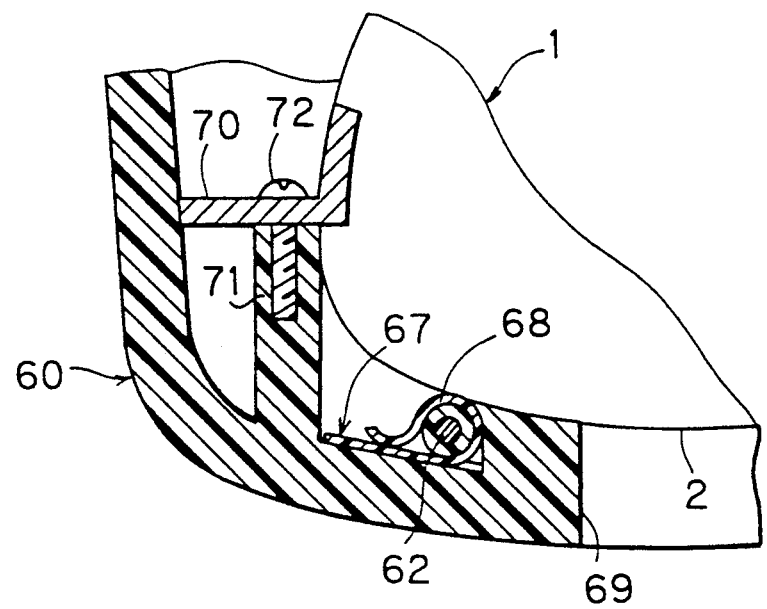
FIG. 13 is an enlarged sectional view showing a part of the front panel 60 which is assembled with a cathode ray tube 1.

Then, the front panel 60 is assembled into the cathode ray tube 1, as shown in FIG. 13. In order to fix this state, screws 72 are threaded into mounting eyes 71, which are provided in the front panel 60, through fixtures 70 provided in the cathode ray tube 1. The wire 62 is held between the cathode ray tube 1 and the front panel 60, to be strongly maintained in this position.

Thus, the wire 62 is arranged in proximity to the peripheral edge of the front surface of the cathode ray tube 1.

Figure 14:
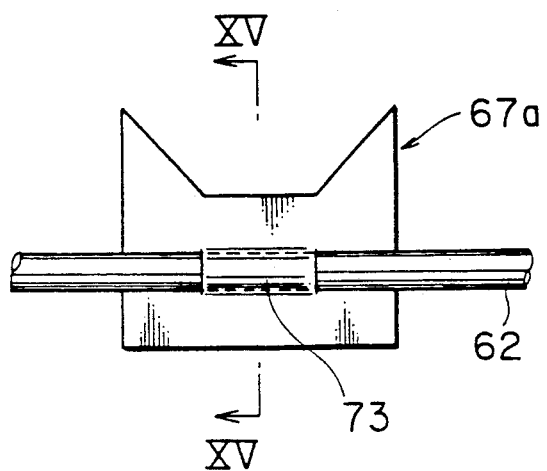
FIG. 14 is a front elevational view showing a stop member 67a which is employed in place of the stop member 67 shown in FIG. 9.
Figure 15:
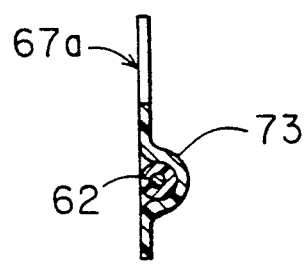
FIG. 15 is a sectional view taken along the line XV—XV in FIG. 14.

FIGS. 14 and 15 show a stop member 67a having another structure, with a part of the wire 62 provided in the aforementioned conductive member 61.

Referring to FIGS. 14 and 15, the stop member 67a has a tubular portion 73 for receiving the wire 62. This stop member 67a is longitudinally movable along the wire 62.

In this case the conductive member 61 is prepared by previously distributing a plurality of such stop members 67a on the wire 62. In order to mount the conductive member 61 on the front panel 60, the stop members 67a receiving the wire 62 are fixed to prescribed positions of the front panel 60 through an adhesive, a pressure sensitive adhesive or a pressure sensitive adhesive double coated sheet. Thereafter the slider 66 is moved along the end portions of the wire 62 similarly to the aforementioned embodiment, to be brought into the state shown in FIG. 9.

Figure 16:
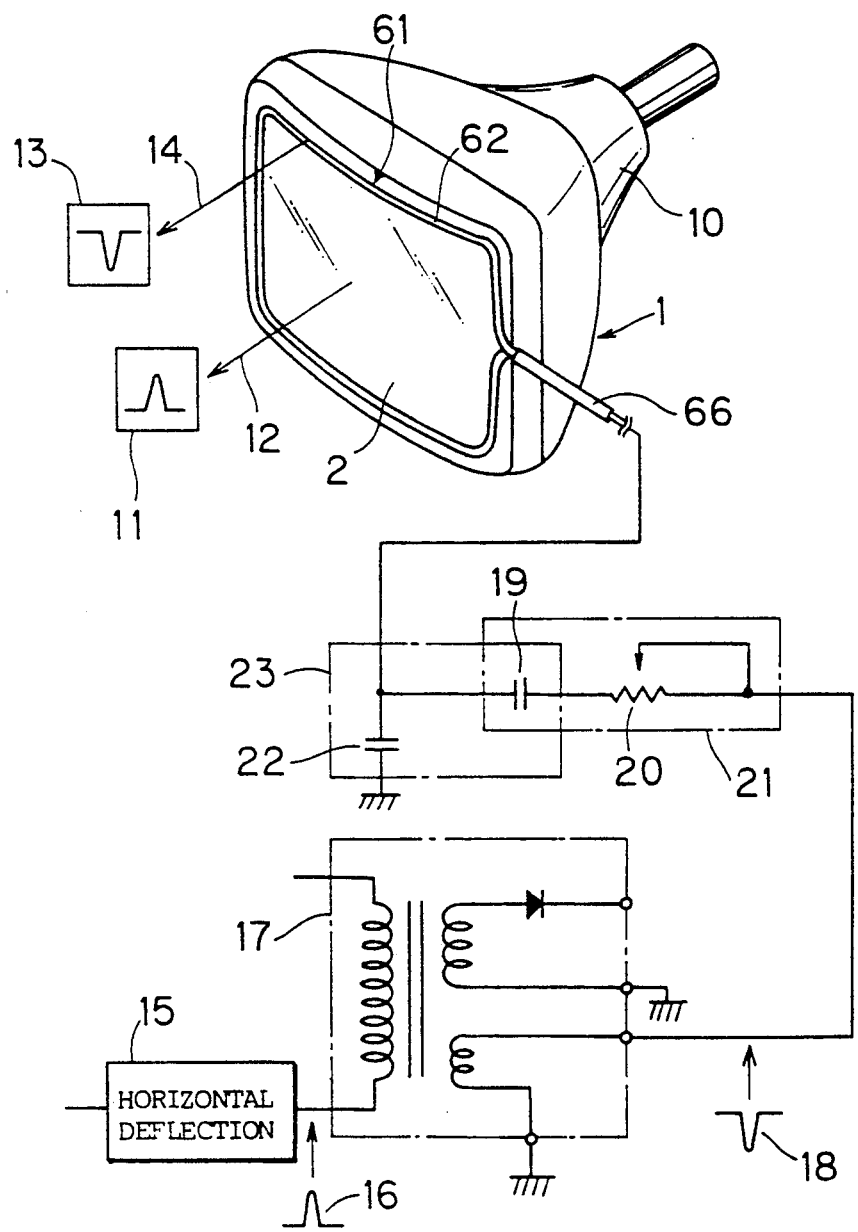
FIG. 16 illustrates an apparatus for suppressing field radiation from a cathode ray tube 1, which is formed by a conductive member 61.

FIG. 16 shows a conductive member 61 having a wire 62, which is arranged in proximity to the peripheral edge of a front surface 2 of a cathode ray tube 1 to be supplied with a voltage for canceling an electric field radiated from the cathode ray tube 1. The embodiment shown in FIG. 16 is adapted to cancel a particularly serious electric field which is caused by flyback pulses of horizontal deflection, among electric fields radiate from the cathode ray tube 1.

FIG. 16 includes elements corresponding to those shown in FIG. 1. Therefore, such corresponding elements are denoted by similar reference numerals to omit redundant description. Referring to FIG. 16, the conductive member 61 is supplied with a voltage which is provided by an output signal 18 of a flyback transformer 17, similarly to the degaussing coil 3 shown in FIG. 1.

The conductive member 61, which is adapted to provide an electric field around the cathode ray tube 1 in the aforementioned embodiment, may alternatively serve as a degaussing coil for providing a magnetic field around the cathode ray tube, or both as an electrode and a degaussing coil. When such a conductive member is employed as a degaussing coil, a large alternating current is fed to the same and hence it is necessary to use a wire which can feed a large current as compared with a case in which the conductive member is employed only for suppressing field radiation. When the conductive member is employed as a degaussing coil, further, both end portions of the wire must be electrically isolated from each other so that the current can be fed to the wire. When the conductive member is employed only as a degaussing coil, it is not necessary to provide the conductive member in front of the front surface of the cathode ray tube but the same may be provided at the back thereof, for example.

Figure 17:
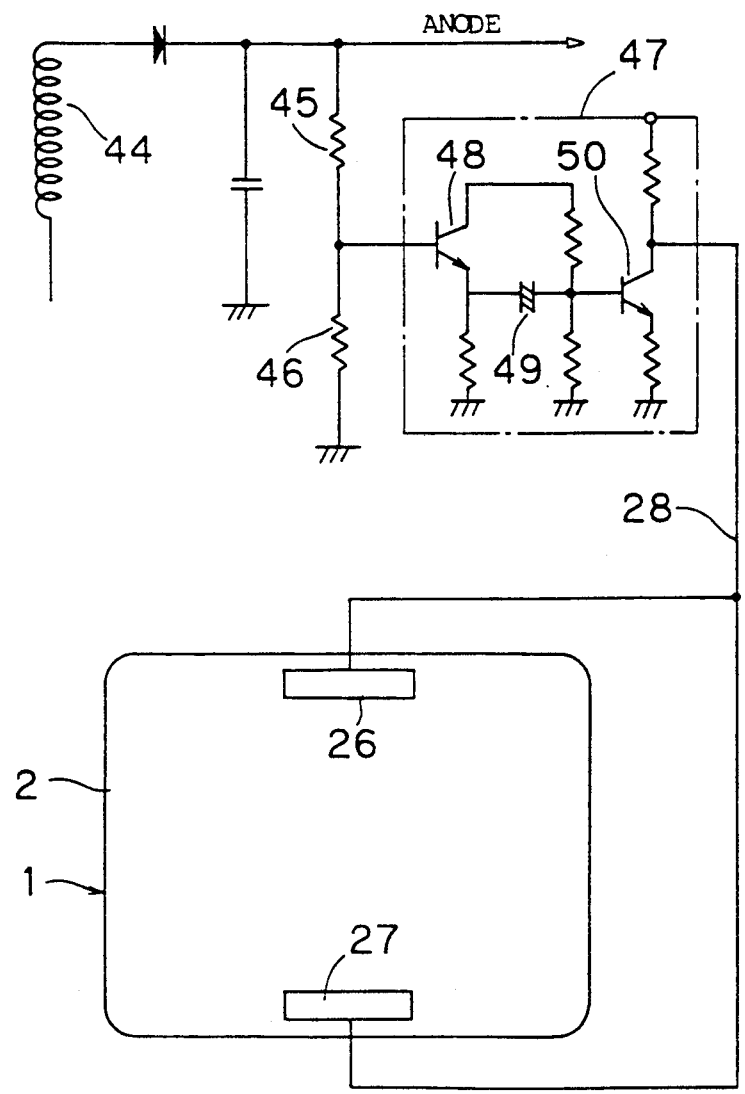
FIG. 17 illustrates an apparatus for suppressing field radiation from a cathode ray tube according to a further embodiment of the present invention, with a front elevational view showing a cathode ray tube 1 and a circuit diagram showing a circuit for obtaining a voltage for suppressing field radiation caused by a voltage which is applied to an anode of the cathode ray tube 1.

FIG. 17 shows a further embodiment of the present invention. This embodiment is adapted to cancel an electric field caused by a voltage fluctuating in vertical synchronization, which is applied to an anode of a cathode ray tube.

Referring to FIG. 17, a secondary coil 44 included in a flyback transformer supplies an anode voltage which is applied to an anode (not shown) of a cathode ray tube 1. The anode voltage is divided by resistors 45 and 46, and thereafter phase-inverted by an inverting circuit 47. The inverting circuit 47 comprises a transistor 48 which receives the divided anode voltage in its base, and another transistor 50 whose base is connected to an emitter of the transistor 48 through a capacitor 49. In such an inverting circuit 47, the transistor 48 impedance-converts the anode voltage divided by the resistors 45 and 46 as described above and then the capacitor 49 extracts only an alternating component, while the transistor 50 outputs the phase-inverted voltage from its collector.

FIG. 17 also illustrates the electrodes 26 and 27 and the lead wires 28 shown in FIG. 3. The output of the inverting circuit 47 is supplied to the electrodes 26 and 27 through the lead wires 28. Thus, it is possible to effectively cancel the electric field being radiated from the anode by the anode voltage fluctuating in vertical synchronization, which is applied to the anode of the cathode ray tube 1, by supplying the electrodes 26 and 27 with the cancel voltage obtained by phase-inverting the anode voltage by the inverting circuit 47.

Referring to FIG. 17, the electrodes 26 and 27 may be replaced by any of the degaussing coil 3 shown in FIG. 1, the degaussing coils 24 and 25 shown in FIG. 2, the electrodes 29 and 30, 32, 36 and 37, 39 and 40 as well as 42 shown in FIGS. 4 to 8, and the conductive member 61 shown in FIGS. 9 to 13.

Figure 18:
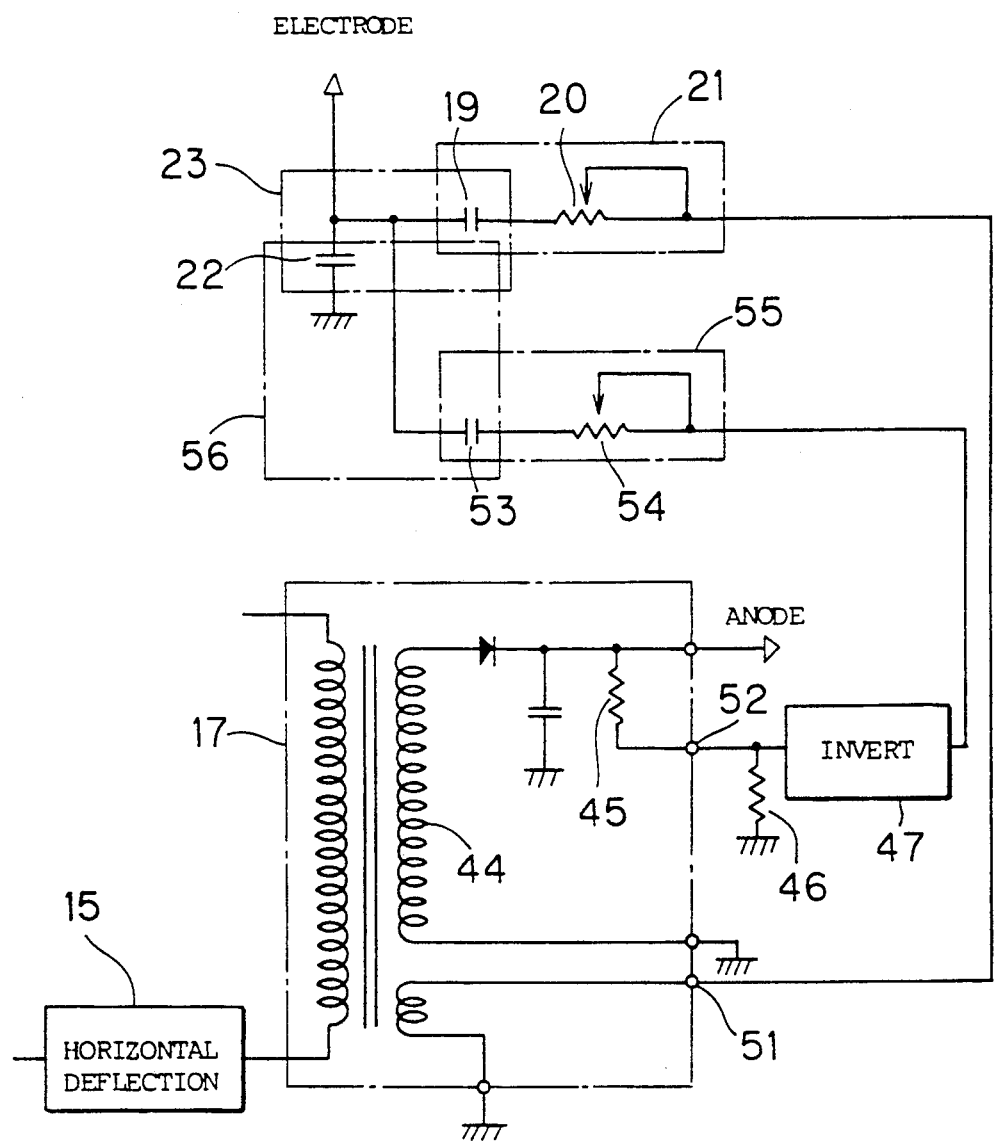
FIG. 18 illustrates an apparatus for suppressing field radiation from a cathode ray tube according to a further embodiment of the present invention, with a circuit diagram showing a circuit for obtaining a voltage for suppressing both of field radiation caused by flyback pulses of horizontal deflection and that caused by a voltage which is applied to an anode of the cathode ray tube.

FIG. 18 shows a further embodiment of the present invention. This embodiment is adapted to cancel both of an electric field caused by flyback pulses of horizontal deflection and that caused by a voltage, fluctuating in vertical synchronization, which is applied to an anode of a cathode ray tube. FIG. 18 includes elements corresponding to those shown in FIGS. 1 and 17, and hence such corresponding elements are denoted by the same reference numerals as those in FIGS. 1 and 17, to omit redundant description.

Referring to FIG. 18, a terminal 51 of a flyback transformer 17 outputs a voltage which is reverse in polarity to an output signal (flyback pulse signal) of a horizontal deflection circuit 15. This voltage is applied to an electrode which is arranged in proximity to the peripheral edge of a front surface of a cathode ray tube through a phase adjusting circuit 21 formed by a capacitor 19 and a variable resistor 20 and an amplitude regulating circuit 23 formed by capacitors 19 and 22. On the other hand, another terminal 52 of the flyback transformer 17 is supplied with a voltage which is obtained by dividing an anode voltage. This voltage is phase-inverted by an inverting circuit 47 and thereafter applied to the electrode through a phase adjusting circuit 55 formed by a capacitor 53 and a variable resistor 54 and an amplitude regulating circuit 56 formed by the capacitors 53 and 22.

According to this embodiment, therefore, it is possible to suppress both the electric field caused by horizontal deflection flyback pulses and that caused by the voltage, fluctuating in vertical synchronization, which is applied to the anode of the cathode ray tube.

Figure 19:
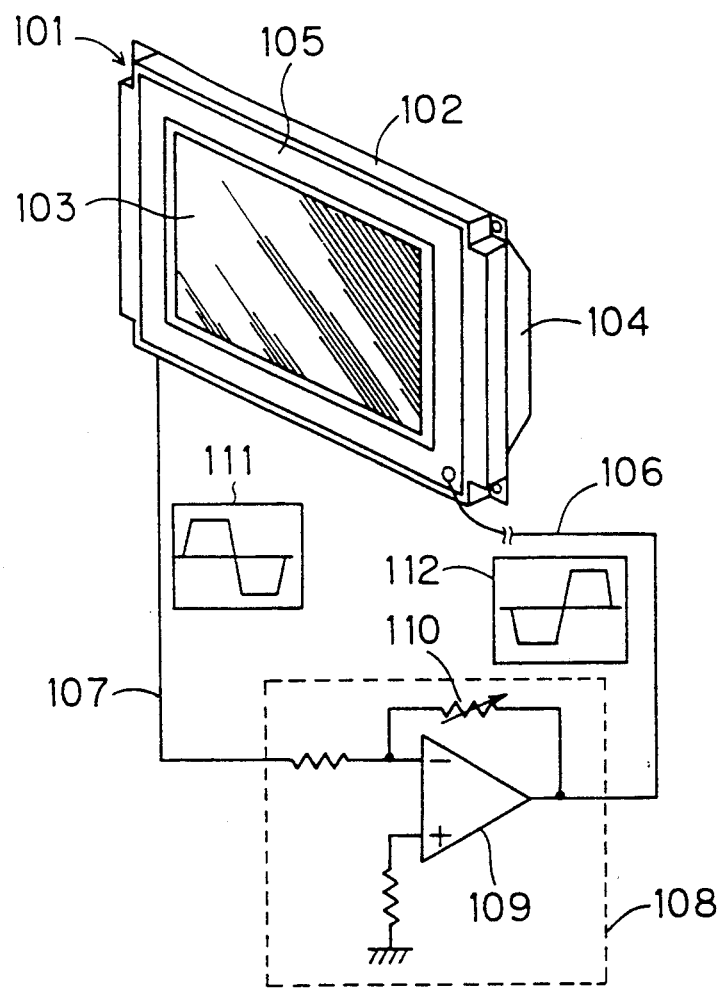
FIG. 19 illustrates an apparatus for suppressing field radiation from a liquid crystal display device 101 according to a further embodiment of the present invention, with a perspective view showing the liquid crystal display device 101 and a circuit diagram showing a circuit for obtaining a voltage for suppressing field radiation.

FIG. 19 shows a further embodiment of the present invention. This embodiment is adapted to suppress field radiation from an alternatingly driven liquid crystal display device 101.

The liquid crystal display device 101 comprises a ground-connected chassis frame 102, which holds a liquid crystal display panel 103. This liquid crystal display panel 103 has a common electrode (not shown). While the liquid crystal display device 101 is driven, an alternating voltage is continuously applied to the common electrode. A back light 104 is provided on the rear surface of the chassis frame 102.

Around the liquid crystal display panel 103, an electrode 105 is stuck onto the chassis frame 102 through an insulating film (not shown). The electrode 105, which is in the form of a loop enclosing the peripheral edge of the liquid crystal display panel 103, is formed by a metal plate or a metal sheet, for example.

The electrode 105 is connected with a lead wire 106. The aforementioned common electrode provided in the liquid crystal display panel 103 is connected through another lead wire 107 with a phase inverting circuit 108, whose output is supplied to the electrode 105 through the lead wire 106. The phase inverting circuit 108 comprises an operational amplifier 109 and a variable resistor 110 which provides an amplitude regulating function.

During the operation of the liquid crystal display device 101, the front surface of the display panel 103 radiates an electric field which is synchronized with the alternating voltage applied to the common electrode. In order to cancel this electric field, the lead wire 107 which is connected with the common electrode is connected to the phase inverting circuit 108. Thus, a signal which is inputted in the phase inverting circuit 108 has a waveform 111, for example. On the other hand, a signal outputted from the phase inverting circuit 108 has an inverted waveform 112 with respect to the waveform 111, and these waveforms are synchronized with each other. The variable resistor 110 which is included in the phase inverting circuit 108 adjusts its output signal to have the most effective amplitude for canceling the electric field, and this output signal is supplied to the electrode 105 through the lead wire 106. Namely, this output signal has a voltage which is reverse in polarity to the electric field radiated from the liquid crystal display panel 103.

Thus, it is possible to effectively cancel the electric field radiated from the liquid crystal display panel 103 by applying a voltage which is reverse in polarity thereto to the electrode 105.

The operational amplifier 109 included in the phase inverting circuit 108 may be replaced by another circuit or device having a phase inverting function such as a circuit employing a transistor, for example, while the variable resistor 110 may also be replaced by another circuit or device having an amplitude regulating function.

Figure 20:
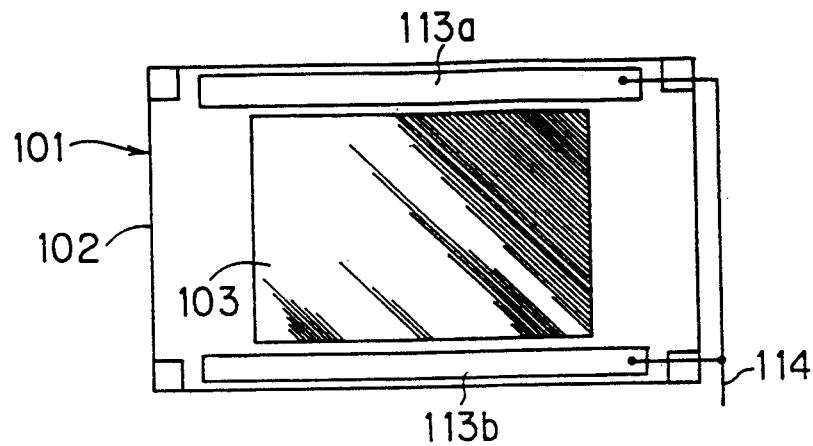
FIG. 20 is a front elevational view showing a liquid crystal display device 101 according to a further embodiment of the present invention.
Figure 21:
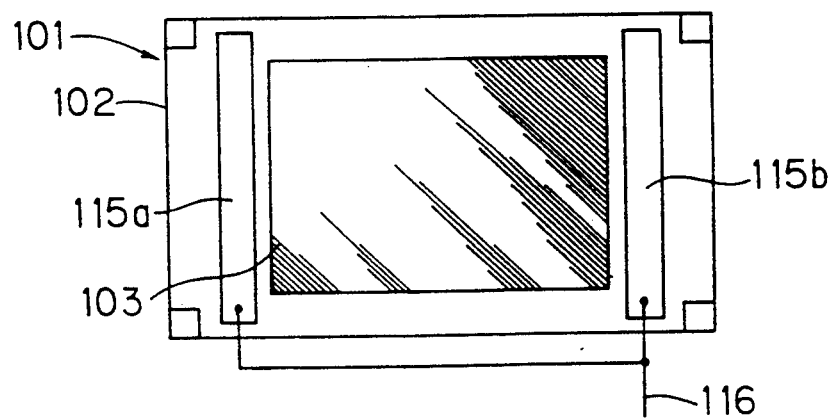
FIG. 21 is a front elevational view showing a liquid crystal display device 101 according to a further embodiment of the present invention.
Figure 22:
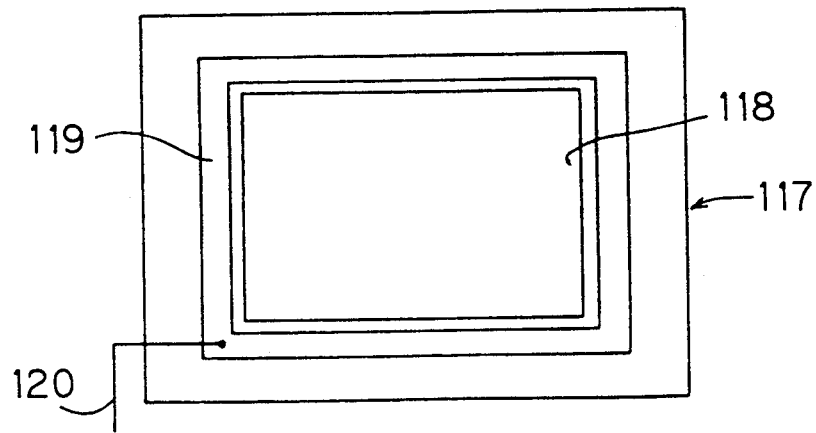
FIG. 22 is a rear elevational view showing a front panel 117 according to a further embodiment of the present invention.

FIGS. 20 to 22 illustrate further embodiments of the present invention, which are modified as to provision of electrodes for applying cancel voltages in relation to liquid crystal display devices.

Referring to FIG. 20, electrodes 113a and 113b made of metal plates or metal sheets are arranged on a chassis frame 102 along upper and lower edges of a liquid crystal display panel 103. A cancel voltage is applied to the electrodes 113a and 113b through lead wires 114.

Referring to FIG. 21, electrodes 115a and 115b of metal plates or metal sheets are arranged on a chassis frame 102 along left and right edges of a liquid crystal display panel 103. A cancel voltage is applied to the electrodes 115a and 115b through lead wires 116.

FIG. 22 shows the rear surface of a front panel 117 which is arranged to cover the periphery of a liquid crystal display panel. A loop-shaped electrode 119 made of a metal plate or a metal sheet is stuck onto the front panel 117 to enclose the periphery of its opening 118. A cancel voltage is applied to the electrode 119 through a lead wire 120. When the front panel 117 is formed of resin, the same may not be electrically insulated from the electrode 119. If there is such a possibility that the electrode 119 comes into contact with a chassis frame which is made of a metal, however, it is necessary to electrically insulate the former from the latter.

Although each of the above embodiments has been described in relation to the alternatingly driven liquid crystal display device 101 and the cancel voltage is extracted from the common electrode, such a cancel voltage may alternatively be extracted from another circuit part.

In addition to a liquid crystal display device, the present invention is also applicable to a flat display device such as a plasma display device, for example. While the cause for an electric field to be suppressed is varied with the type of the flat display device and hence the cancel voltage is also varied with the type of the electric field to be suppressed, a voltage derived from the voltage generating the electric field to be suppressed is preferably employed as the cancel voltage, in any case.

Although the present invention has been described and illustrated in detail, it is clearly understood that the same is by way of illustration and example only and is not to be taken by way of limitation, the scope of the present invention being limited only by the terms of the appended claims.

WHAT IS CLAIMED IS:

1. An apparatus for suppressing electric field radiation from a display device, comprising:
    an electrode arranged in proximity to the peripheral edge of a display surface of a display device; and
    means for supplying said electrode with a voltage of reverse polarity relative to an electric field radiated from said display surface of said display device.

2. An apparatus for suppressing electric field radiation from a display device in accordance with claim 1, wherein said display device includes a cathode ray tube, said electrode is arranged in proximity to the peripheral edge of said front surface of said cathode ray tube, and said electric field includes an electric field radiated from said front surface of said cathode ray tube.

3. An apparatus for suppressing electric field radiation from a display device in accordance with claim 2, wherein a degaussing coil is provided in relation to said cathode ray tube, said electrode being provided by said degaussing coil.

4. An apparatus for suppressing electric field radiation from a display device in accordance with claim 3, wherein said degaussing coil is connected to a degaussing power source for generating an alternating current which is attenuated with a lapse of time, said apparatus further comprising means for completely cutting connection between said degaussing coil and said degaussing power source.

5. An apparatus for suppressing electric field radiation from a display device in accordance with claim 4, wherein said means for cutting connection includes a timer-controlled switch.

6. An apparatus for suppressing electric field radiation from a display device in accordance with claim 2, wherein said means for supplying said electrode with said voltage of reverse polarity includes means for adjusting the phase and regulating the amplitude of said voltage of reverse polarity.

7. An apparatus for suppressing electric field radiation from a display device in accordance with claim 2, wherein said voltage of reverse polarity is provided by a signal of reverse in polarity relative to a flyback pulse signal of a horizontal deflection circuit, said signal being derived from said flyback pulse signal.

8. An apparatus for suppressing electric field radiation from a display device in accordance with claim 2, wherein said voltage of reverse polarity includes a voltage obtained by phase-inverting a voltage, fluctuating in vertical synchronization, which is applied to an anode of said cathode ray tube.

9. An apparatus for suppressing electric field radiation from a display device in accordance with claim 2, wherein said voltage of reverse polarity includes a voltage provided by a signal which is reverse in polarity to a flyback signal of a horizontal deflection circuit, said signal being derived from said flyback pulse signal, and a voltage obtained by phase-inverting a voltage, fluctuating in vertical synchronization, which is applied to an anode of said cathode ray tube.

10. An apparatus for suppressing field radiation from a display device in accordance with claim 2, further comprising a plurality of stop members arranged around said cathode ray tube, and said electrode comprises a conductive member provided with a conductive wire of a prescribed length having both end portions being tied up toward the same direction, said conductive member engaging with said plurality of stop members, and a slider being movable along said tied end portions of said wire while receiving said end portions in common.

11. An apparatus for suppressing electric field radiation from a display device in accordance with claim 10, wherein said plurality of stop members are located on a front panel which is arranged to cover the periphery of said front surface of said cathode ray tube.

12. An apparatus for suppressing electric field radiation from a display device in accordance with claim 10, wherein said conductive wire is insulation-coated.

13. An apparatus for suppressing electric field radiation from a display device in accordance with claim 10, wherein said slider has a tubular configuration.

14. An apparatus for suppressing electric field radiation from a display device in accordance with claim 13, wherein said slider is formed of an insulating material.

15. An apparatus for suppressing electric field radiation from a display device in accordance with claim 1, wherein said display device includes a display panel of an alternatingly driven flat display device, said electrode is arranged in a peripheral portion of said display panel, and said electric field includes an electric field radiated from said display panel.

16. An apparatus for suppressing electric field radiation from a display device in accordance with claim 15, wherein said means for supplying said electrode with said voltage of reverse polarity includes means for amplitude-regulating said voltage of reverse polarity.

17. An apparatus for suppressing electric field radiation from a display device in accordance with claim 15, wherein said display panel comprises a liquid crystal display panel having a common electrode which is supplied with an alternating voltage.

18. An apparatus for suppressing electric field radiation from a display device in accordance with claim 17, wherein said means for supplying said electrode with said voltage of reverse polarity includes means for phase-inverting said alternating voltage.

19. An apparatus for suppressing field radiation from a display device in accordance with claim 15, further including a chassis frame for holding said display panel, said electrode being arranged on said chassis frame.

20. An apparatus for suppressing field radiation om a display device in accordance with claim 15, further including a front panel which is arranged to cover the periphery of said display panel, said electrode being arranged on said front panel.

* * * * *